United States Patent [19]

Chabot

[11] Patent Number: 4,735,122
[45] Date of Patent: Apr. 5, 1988

[54] PRECISION PIN GAUGING SYSTEM

[75] Inventor: Robert O. Chabot, 13522 - 40th Ave. NE., Seattle, Wash. 98125

[73] Assignee: Robert O. Chabot, Seattle, Wash.

[21] Appl. No.: 16,267

[22] Filed: Feb. 19, 1987

[51] Int. Cl.[4] .............................................. B23D 33/10
[52] U.S. Cl. ................................ 83/467 A; 83/467 R; 83/468
[58] Field of Search .................. 83/468, 467 R, 467 A

[56] References Cited

U.S. PATENT DOCUMENTS 2,156,015  4/1939  Greiner .............................. 83/467 A
2,769,493  11/1956  Karsoe .............................. 83/467 A

OTHER PUBLICATIONS

Prior Art Pin Gauge Device, 4 photographs 1, 2, 3, 4.

Primary Examiner—Donald R. Schran
Attorney, Agent, or Firm—Gregory W. Moravan

[57] ABSTRACT

A precision pin gauging system for a sheet metal shearing machine, wherein the pin gauging system comprises a horizontal mounting bar secured to the front of the shearing machine and a pair of pin gauge devices. Each pin gauge device includes clamping means for releasably securing it to the mounting bar as desired. Each pin gauge device also includes a spring loaded, pivoting gauging arm for releasably engaging the gauging holes in the work piece. Each pin gauge further includes a micrometer adjustment screw for precisely setting the exact desired distance between the gauging arm and the shearing means in the shearing machine.

5 Claims, 2 Drawing Sheets

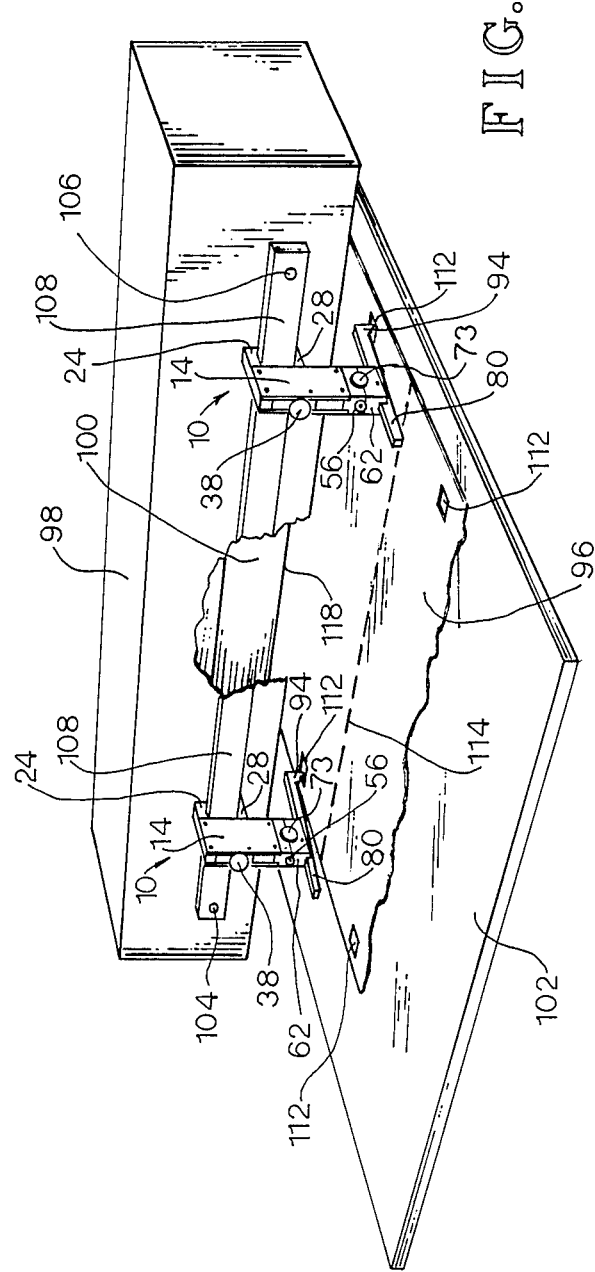

PRECISION PIN GAUGING SYSTEM

BACKGROUND OF THE INVENTION

The present invention relates to gauging systems, and more particularly, it relates to a precision pin gauging system.

SUMMARY OF THE INVENTION

In the manufacture of identical parts which are made from sheet metal, an efficient way to make them is to use a metal shearing mechine to cut them consecutively from a long piece of sheet metal.

For sheet metal parts which must be made close tolerances, it is essential that durable gauge means be provided which will quickly, easily and very accurately gauge and control how much of the sheet metal is fed into the shearing machine prior to each sheet metal part being cut from the sheet metal by the shearing machine.

The precision pin gauging system of the present invention meets at least all of these objectives.

in basic form, the precision pin gauging system of the present invention comprises a mounting bar secured horizontally to the front of the shearing machine above the shearing machine's feed slot, the mounting bar in turn carrying a pair of precision pin gauges.

Each pin gauge preferably includes a clamping mechanism which permits its easy installation on and removal from the mounting bar. The clamping mechanism also permits each pin gauge to be moved towards or away from the other pin gauge on the mounting bar, so tne precision pin gauging system of the present invention can be used with sheet metal of various widths. Once each pin gauge has been properly located, its clamping mechanism then securely holds it in its desired location on the mounting bar.

Each pin gauge also preferably includes a pivoting gauging arm which is spring loaded to permit its gauging pin to ride up and over the top surface of the sheet metal being fed beneath the pin gauge, and to permit its gauging pin to be urged down into any of the gauging holes provided in the sheet metal.

Each pin gauge also preferably includes an adjustment mechanism to permit the distance between the shear in the shearing machine and the pin gauge's gauging pin to be set very accurately.

The foregoing is intended to be but a brief summary of, and not a detailed catalog of, the various objects, features, advantages and characteristics of the present invention since these and further objects, features, advantages and characteristics will be expressly or inherently disclosed to those of ordinary skill in the art to which the present invention pertains in view of all of the disclosures herein.

BRIEF DESCRIPTION OF THE FIGURES

FIG. 2 is a simplified schematic perspective view of the pin gauging system of the present invention in use on a metal shearing machine.

DESCRIPTION OF THE PREFERRED EMBODIMENTS

Figure 1:
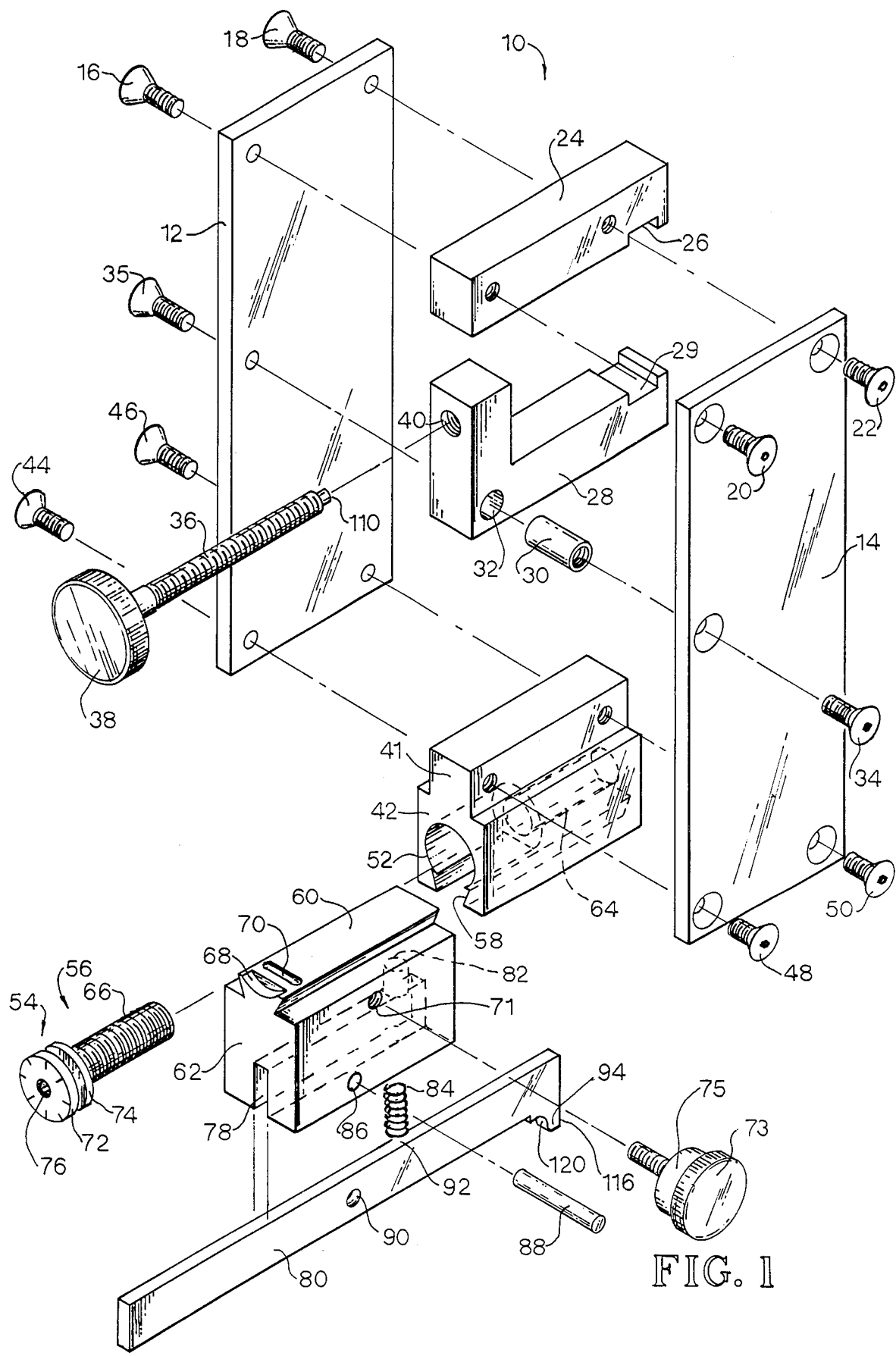
FIG. 1 is an exploded perspective view of a pin gauge of the present invention.

Referring now to the figures, each pin gauge 10 comprises a pair of mounting block side plates 12, 14, between which are mounted, with mounting screws 16, 18, 20, 22, a fixed upper clamping arm 24 having a clamping notch 26.

A pivoting lower clamping arm 28 having a clamping notch 29 and having a threaded bearing sleeve 30 located in bore 32 is mounted between side plates 12, 14 with pivot screws 34, 35 which thread into opposite ends of bearing sleeve 30. A long clamping screw 36 having a knob 38 is received by threaded bore 40 in lower clamping arm 28. Lower clamping arm 28 has a thickness just slightly less than that of upper clamping arm 24, thereby permitting it to pivot freely between side plates 12, 14.

The lower portions of side plates 12, 14 are mounted to the necked top portion 41 of upper adjusting block 42 with mounting screws 44, 46, 48, 50. The thickness of necked top portion 41 of upper adjusting block 42 is the same as that of upper clamping arm 24. Upper adjusting block 42 contains a bore which has an upper arcuate cross section portion 52 sized to receive head 54 of micrometer adjusting screw 56, which has a lower dovetail cross section portion 58 sized to receive the dovetail 60 on the top of lower adjusting block 62; and which has a threaded portion 64 sized to receive the threaded shank 66 of micrometer adjusting screw 56. A pair of notches 68, 70 in the top of the dovetail 60 of lower adjusting block 62 are sized and located so as to receive mating flanges 72, 74 on the head 54 of micrometer adjusting screw 56.

When upper and lower adjusting blocks 42, 62 and micrometer adjusting screw 56 are assembled together, it will now be apparent that turning micrometer adjusting screw 56 with an Allen wrench placed in its hex hole 76 will move lower adjusting block 62 forward and back longitudinally as desired with respect to upper adjusting block 42. This is because as adjusting screw 56 is turned clockwise, more and more of its threaded shank 66 is engaged in threaded bore 64 causing its head 54 with its flanges 72, 74 to move towards the right in the drawing. But since flanges 72, 74 are received by notches 68, 70 in lower adjusting block 62, lower adjusting block 62 is also moved to the right in the drawing which respect to upper adjusting block 42. Similarly, turning micrometer adjusting screw 56 counterclockwise causes lower adjusting block 62 to move to the left in the drawing with respect to upper adjusting block 42.

Lower adjusting block 62 defines a threaded bore 71 which receives thrumbscrew 73. When thumbscrew 73 is screwed down tightly, its collar 75, which overlaps portions of both upper and lower adjusting blocks 42, 64, frictionally engages both the upper and lower adjusting blocks 42, 62, thereby preventing any undesired relative movement between upper and lower adjusting blocks 42, 62. Similarly, when thumbscrew 73 is loosened, relative movement between upper and lower adjusting blocks 42, 62 is permitted.

Lower adjusting block 62 also has a rectangular slot 78 sized to receive the central portion of gauging arm 80; it has an internal chamber 82 sized to receive compression spring 84; and it has a transverse bore 86 which passes completely through lower adjusting block 62 and which is sized to receive gauging arm pivot pin 88 with a snug friction fit. When assembled, pivot pin 88 passes through bore 90 in gauging arm 80, while compression spring 84 in chamber 82 acts against upper surface 92 of gauging arm 80. Pivot pin 88 mounts gauging arm 80 so its top surface 92 is spaced some distance away from the top of slot 78 in adjusting block 62. This is done to permit gauging arm 80 to rotate clockwise about pivot 88 under the urging of spring 84 until such rotation is stopped by its gauging pin 94 contacting work piece 96 or work surface 102 (see FIG. 2), or until a portion of top surface 92 of gauging arm 80 located to the left of its bore 90 contacts the top of slot 78. Similarly, manually pressing down on the left end of gauging arm 80 which protrudes from lower adjusting block 62 causes gauging arm 80 to rotate counterclockwise on its pivot 88 to raise its gauging pin 94 free of work piece 96 or work surface 102.

Referring now to FIG. 2, a sheet metal shearing machine 98 is schematically illustrated having an internal shearing blade 100 and an externally projecting, horizontal work surface 102 upon which rests work piece 96, which is a long piece of sheet metal.

Bolts 104, 106 secure mounting bar 108 to the front of shearing machine 98 so mounting bar 108 is horizontally oriented and is parallel to shearing blade 100. Spacers (not seen) are located on bolts 104, 106 to space mounting bar 108 away from the front of shearing machine 98 for a short distance so upper and lower clamping arms 24, 28 of pin gauges 10 can fit around the top and bottom surfaces of mounting bar 108. Naturally, clamping notches 26, 29 on clamping arms 24, 28 are sized to snugly receive the top and bottom surfaces of mounting bar 108.

To attach a pin gauge 10 to mounting bar 108, lower clamping arm 28 is first manually rotated on its pivot bearing 30 until its clamping notch 29 is as far as possible from clamping notch 26 on upper clamping arm 24. Then clamping notch 26 on upper clamping arm 24 is engaged with the top of mounting bar 108. Next, knob 38 on clamping screw 36 is turned clockwise until the right end 110 of clamping screw 36 contacts mounting bar 108. As knob 38 is then turned clockwise even further, clamping screw 36 then forces lower clamping arm 28 to rotate counterclockwise on its pivot 30 until its clamping notch 29 is firmly engaged with the bottom of mounting bar 108, thereby locking pin gauge 10 securely in place on mounting bar 108. When pin gauge 10 is clamped in place on mounting bar 108, the front edges of its side plates 12, 14 are located against mounting bar 108. Mounting bar 108 is mounted above horizontal work surface 102 of shearing machine 98 a distance selected to ensure that when pin gauges 10 are mounted thereto, their gauging pins 94 are in contact with work surface 102 and their gauging arms 10 are horizontal.

Before using the pin gauging system of the present invention, the particular work piece 96 which is to be sheared must first be prepared. This is done by punching out pairs of gauging holes 112 in the sides of work piece 96. At this time any other hole forming work on the parts to be formed from work piece 96 may also be done.

Preferably, each gauging hole 112 is larger than gauging pin 94, and there is one pair of such gauging holes 112 for each part to be formed from work piece 96. The distance between consecutive pairs of gauging holes 112 on work piece 96 is equal to the length of the part to be sheared from work piece 96. Both gauging holes in each pair of gauging holes 112 are located the same distance from the intended shear line of their respective part to be sheared from work piece 96. Referring to FIG. 2, dotted line 114 represents a shear line where work piece 96 will be cut by shearing machine 98.

After gauging holes 112 are formed in work piece 96, pin gauges 10 on mounting bar 108 are loosened by unscrewing their clamping screws 36 slightly, and are then slid as needed back and forth on mounting bar 108 until the center to center spacing of their gauging pins 94 is the same as the center to center spacing of each pair of gauging holes 112. Then pin guages 10 are resecured to mounting bar 108 by retightening their clamping screws 36.

Next, as work piece 96 is slid forward towards shearing blade 100, gauging pins 94 on spring loaded gauging arms 80 automatically ride up onto the top surface of work piece 96 due to bevel 120 provided on the side of each gauging pin 94 which faces away from shearing blade 100. As work piece 96 is urged further forward toward shearing blade 100, gauging pins 94 on spring loaded gauging arms 80 are urged into their respective gauging holes 112. Then work piece 96 is pulled gently back away from shearing blade 100 until the edges of their respective gauging holes 112 which are closest to shearing blade 100 contact front edges 116 of gauging pins 94.

At this time the distance between the front edges 116 of gauging pins 94 and the cutting edge 118 of shearing machine 98 is measured, and then adjusted as needed by use of micrometer adjusting screws 56, up to an accuracy of about plus or minus 0.005 inches thereby ensuring the accurate shearing of the part form work piece 96 by shearing machine 98. Naturally, thumbscrews 73 are loosened prior to making any adjustments with micrometer adjusting screws 56, and are then retightened after the adjustments have been made to help ensure there is no undesired movement of lower adjusting blocks 62 with respect to upper adjusting blocks 42.

After shearing the first part from work piece 96, work piece 96 is slid forward until gauging pins 94 engage the next set of gauging holes 112, and the process is repeated. As has been described, gauging pins 94 may be disengaged from work piece 96 and from gauging holes 112 by manually pushing down on the ends of gauging arms 80 opposite their gauging pins 94 until their gauging pins 94 lift free of work piece 96.

From the foregoing, various further applications, modifications and adaptions of the present invention will now be apparent to those skilled in the art to which it pertains, within the scope of the following claims.

What is claimed is:

1. A precision pin gauging system for a shearing machine, wherein said shearing machine is for shearing a work piece and includes shearing means, wherein said work piece includes at least one pair of opposite gauging holes located adjacent its lateral edges, and wherein said pin gauging system comprises:

a mounting bar secured to a front of said shearing machine, said mounting bar having upper and lower edges; and a pair of pin gauge devices adapted to be releasably secured to said mounting bar; wherein each said pin gauge device comprises:

a mounting block means;

a clamping means for releasably securing said mounting block means to said mounting bar;

a gauging arm adapted to engage a respective said gauging hole in said work piece; and adjustment means for securing said gauging arm to said mounting block means, and for permitting the selective movement of said gauging arm towards and away froms said shering means;

wherein said clamping means comprise upper and lower clamping arms having respective clamping notches adapted to releasably receive and grip said upper and lower edges of said mounting bar;

wherein said clamping means further comprises a clamping screw and a clamping arm pivot;

wherein one of said clamping arms is fixed with respect to said mounting block means;

wherein the other of said clamping arms is pivotally mounted to said mounting block means by said clamping arm pivot and defines a threaded bore which threadedly receives said clamping screw;

wherein said threaded bore has an axis which is at least generally transverse with respect to an axis of said clamping arm pivot;

wherein said threaded bore and said clamping screw are offset from said clamping arm pivot; and wherein, as said clamping screw is screwed further and further in, an end of said clamping screw moves toward and pushes against said mounting bar to cause said pivotally mounted clamping arm to pivot on its said clamping arm pivot until its respective clamping arm notches move towards and firmly engages a respective edge of said mounting bar.

2. A precision pin gauging system for a shearing machine, wherein said shearing machine is for shearing a work piece and includes shearing means, wherein said work piece includes at least one pair of opposed gauging holes located adjacent its lateral edges, and wherein said pin gauging system comprises:

a mounting bar secured to a front of said shearing machine, said mounting bar having upper and lower edges; and a pair of pin gauge devices adapted to be releasably secured to said mounting bar; wherein each said pin gauge device comprises:

a mounting block means;

a clamping means for releasably securing said mounting block means to said mounting bar;

a gauging arm adapted to engage a respective said gauging hole in said work piece; and adjustment means for securing said gauging arm to said mounting block means, and for permitting the selective movement of said gauging arm towards and away froms said shearing means;

wherein said adjustment means comprises:

an upper adjustment block secured to said mounting block means; and a lower adjustment block carried by said upper adjustment block;

wherein said lower adjustment block carries said gauging arm; and wherein there is a slip fit between said upper and lower adjustment blocks to permit said lower adjustment block and said gauging arm which it carries to be selectively moved with respect to said upper adjustment block towards and away from said shearing means.

3. A precision pin gauging system according to claim 2, wherein said adjustment means further comprises micrometer adjusting screw means for precisely moving said lower adjustment block with respect to said upper adjustment block towards and away from said shearing means.

4. A precision pin gauging system according to claim 2, wherein said gauging arm is pivotally mounted to said lower adjustment block to permit a gauging pin end of said gauging arm to move towards and away from said work piece; and wherein said adjustment means further comprises means for biasing said gauging pin end of said gauging arm towards said work piece.

5. A precision pin gauging system according to claim 4, wherein said gauging pin includes a beveled surface facing away from said shearing means;

wherein said beveled surface helps said gauging pin to ride up and onto an upper surface of said work piece when said work piece is urged towards said shearing means; and wherein said gauging pin includes a flat, vertical surface located opposite said beveled surface which helps said gauging pin to engage a respective said gauging hole in said work piece when said work piece is urged away from said shearing means.

* * * * *